Feb. 21, 1961    A. S. JOUKAINEN ET AL    2,972,359
VARIABLE BACK PRESSURE REGULATOR
Filed Aug. 7, 1958    2 Sheets-Sheet 2
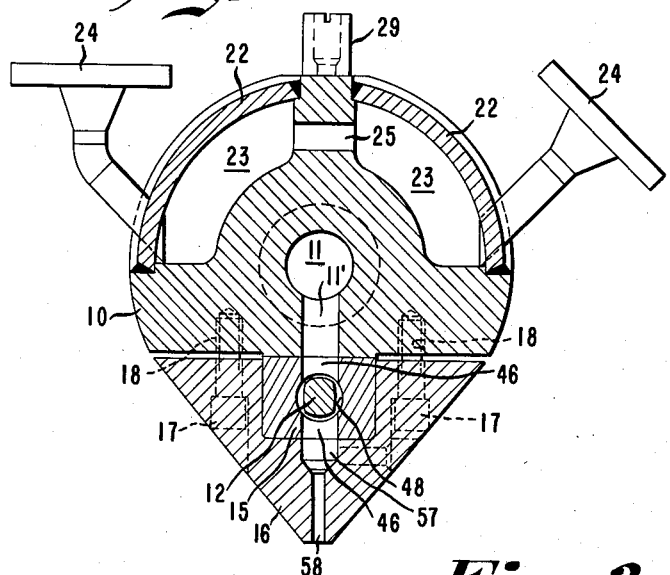
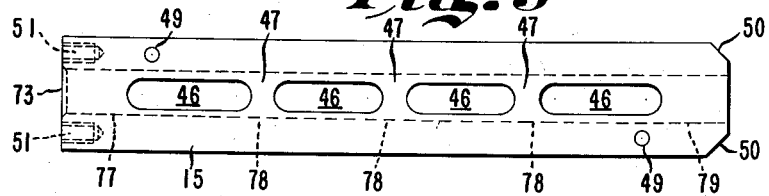
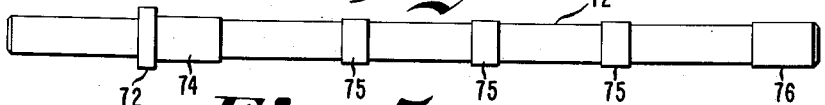
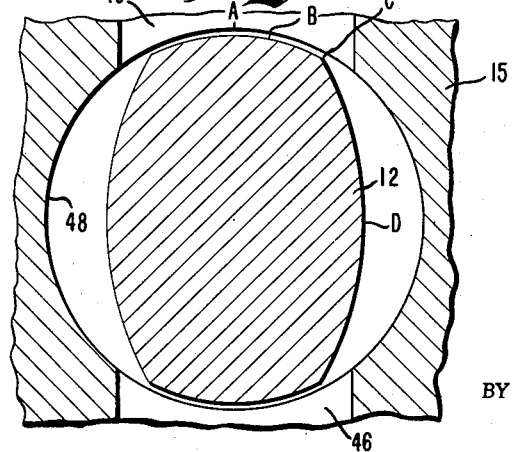
INVENTORS
ARNOLD S. JOUKAINEN
JOHN E. POVELONES
BY Harry J. McCauley
ATTORNEY

United States Patent Office 2,972,359
Patented Feb. 21, 1961

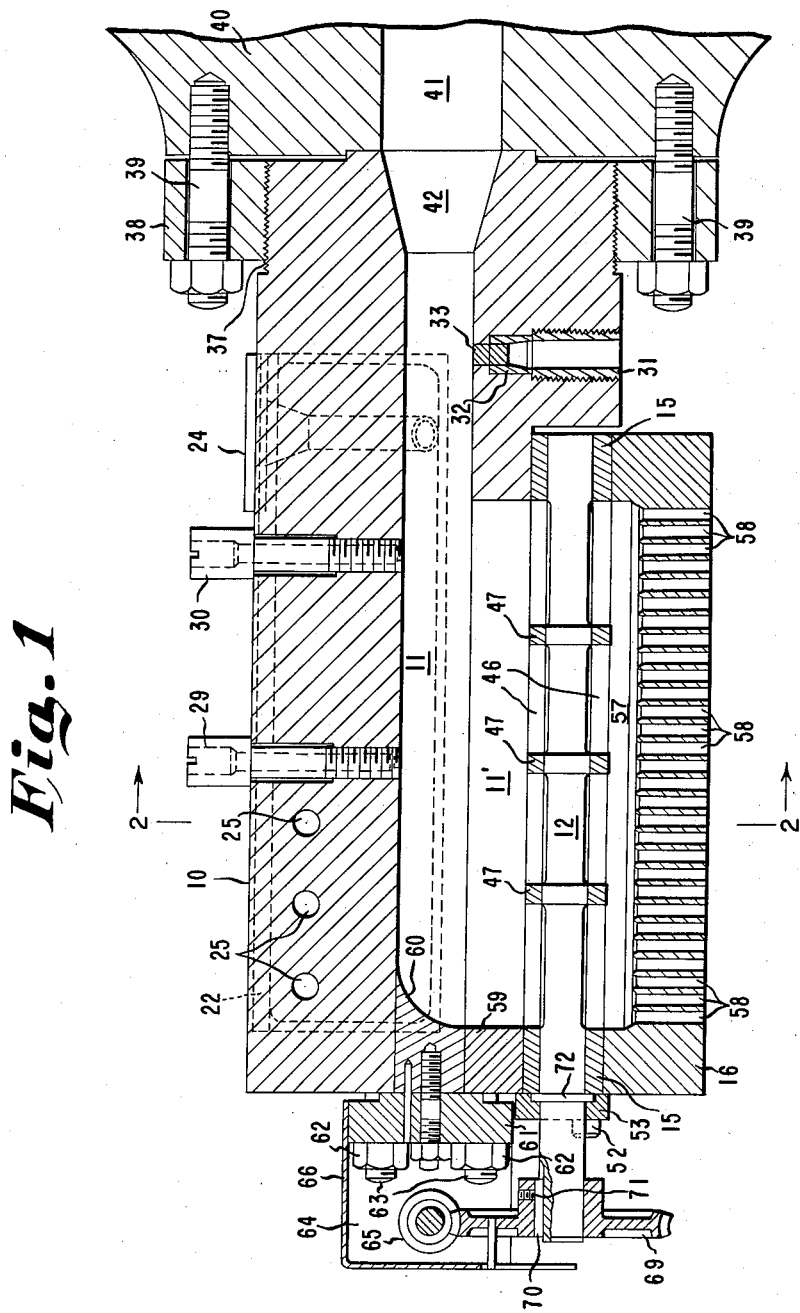

2,972,359

VARIABLE BACK PRESSURE REGULATOR

Arnold S. Joukainen, Wilmington, Del., and John E. Povelones, Cochranville, Pa., assignors to E. I. du Pont de Nemours and Company, Wilmington, Del., a corporation of Delaware Filed Aug. 7, 1958, Ser. No. 753,710

2 Claims. (Cl. 138—46)

This invention relates to a variable back pressure regulator and particularly to a variable back pressure regulator which is adapted to operation in conjunction with a device supplying molten thermoplastic material to an extrusion die.

Polymeric materials having thermoplastic properties must be melted and resolidified to obtain desired physical forms, such as strands, sheets, or the like. Conventionally, this melting is conducted in a device which ejects the molten polymer under considerable pressure to an extrusion die through which the material passes and is constrained to the desired shape, after which it is solidified as the final product. Quite often the extrusion die is of substantial length and the supply passage from the extruder to the die presents a resistance to fluid flow which varies with the length of path and therefore causes unequal flows of molten polymer to specific die outlets or regions. Even more troublesome is the fact that a predetermined dwell time within the polymer melting apparatus is necessary to insure that the plastic product is completely melted, and therefore homogeneous, and, conversely, that the dwell for each finite portion be essentially the same to eliminate pyrolytic decomposition or the like. The apparatus of this invention is intended to afford precise equal flow regulation which insures attainment of these objectives.

The following drawings illustrate a preferred embodiment of this invention useful for the extrusion forming of plastic strands, such as those which are later subdivided into small cylinders for sale as molding material, in which:

Fig. 1 is a longitudinal section of a complete pressure regulator in assembled relationship with a conventional polymer melting apparatus, Fig. 2 is a section on line 2—2 of Fig. 1, Fig. 3 is a bottom plan view of the insert piece cooperating with the choke, Fig. 4 is a side elevation of the choke cooperating with the insert piece of Fig. 3, and Fig. 5 is a greatly enlarged cross-sectional view of a preferred shape of choke in assembled relationship with respect to the bore of its associated insert piece.

Generally, the variable back pressure regulator of this invention comprises a main body piece adapted to be connected to a source of molten polymer supply, which body piece is provided with a passage for conducting the molten polymer to the extrusion die, and a rotatable choke mounted in the line of flow between the passage and the extrusion die and substantially normal thereto in a position interposing a predetermined restriction to the flow of polymeric material from the passage around both sides of the choke to the extrusion die.

Referring to Figs. 1 and 2, the pressure regulator body piece is represented at 10, which preferably is a unitary casting of inverted T general shape which is drilled axially at 11 to provide a passage for molten polymer feed and which is further provided with a radially oriented slot 11' which opens centrally upon the choke 12 accomplishing the pressure regulation function. To facilitate the construction and provide rigidity under the rather high pressure loads during operation, it is preferred to provide the apparatus with an insert piece 15 cooperating with choke 12 and supported in place by the die body per se, 16, which, in the design disclosed, is a unitary metal casting of generally triangular shape secured to body piece 10 by a plurality of bolts 17 engaging with tapped holes 18.

Body piece 10 is closed off at the top by welded arcuate plates 22 which define symmetrically disposed heating fluid chambers 23, which are provided with fluid supply and exit passages 24 adapted to connection with a standard piping system not detailed. Passageways 25 connect the two heating fluid chambers 23 one with another through the central web of body piece 10. Axially drilled studs 29 and 30 constitute connections for conventional temperature and pressure sensing devices. As shown in Fig. 1, 31 is a centrally drilled stud which bears on bushing 32 within which is mounted a rupture disc 33 oriented away from any location to which workmen normally go, so that abnormal pressures can be safely vented without destruction of the apparatus if such pressures should ever develop. Body piece 10 is threaded at its innermost end 37 for attachment to a collar 38 which is provided with a bolt circle receiving bolts 39 attaching the entire mechanism to the molten polymer supply apparatus, indicated generally at 40. The supply apparatus is of conventional design and may conveniently comprise mechanism such as that shown in U.S. Patent 2,037,823, provided with an advancing screw which discharges into bore 41 opening into passage 11 through intermediate reduction passage 42 in body piece 10. It will be understood that supply apparatus 40 may be provided with heating passages or equivalent apparatus, not shown, which melts the polymer to the liquid state so that a homogeneous liquid is supplied to the pressure regulator of this invention, although the viscosity of the mixture may vary widely due to different degrees of polymerization of the polymer, or for other reasons.

Back pressure regulation according to this invention is obtained by the preselected positioning of choke 12 with respect to insert piece 15. Referring to Figs. 2 and 3 particularly, insert piece 15 is of elongated rectangular shape as seen in plan, while being nearly square in cross section as shown in Fig. 2. Piece 15 is provided with four through-going passages 46 in the design detailed which are separated one from another by relatively narrow webs 47 which are adapted to support choke 12 as hereinafter described in greater detail. Normal to intermediate passages 46 is a centrally drilled circular bore 48 (see also Fig. 5) with which choke 12 cooperates. Insert piece 15 is preferably provided with two dowel pins 49 which engage with matching bores in die body 16, thereby correctly orienting the insert piece with respect to the die body. The inner end of 15 is beveled as indicated at 50 to mate with corresponding bevels, not shown, in die body 16 and is provided at its outer end with two tapped bolt holes 51 which receive bolts 52 (see Fig. 1) securing choke 12 in axial position by bearing on retaining plate 53 abutting on both end piece 59 attached to body piece 10 and die body 16.

Lowermost passage 46 of insert piece 15 opens into slot 57 which in turn discharges into the individual circular cross section extrusion passages 58, of which there are a multiplicity as indicated in Fig. 1 arranged in a common line radially of passage 11 and equidistant from choke 12.

The outermost end of passage 11 is closed off by end piece 59, and interiorly curved companion end piece 60, the latter of which streamlines the flow of molten polymer through the apparatus. End pieces 59 and 60 are retained in position on body piece 10 by plate 61 secured to body piece 10 by nuts 62 engaging with bolts 63 attached to body piece 10. Plate 61 is provided with flanges 64 at either end within which are journaled worm 65. Worm wheel 69 engaging with worm 65 is attached to the outer end of choke 12 by key 70 and set screw 71. Screw-attached safety shield 66 encloses the worm and worm wheel set within a depending apron outwardly disposed from the complete apparatus.

Referring to Figs. 4 and 5 particularly, choke 12 is provided with an enlarged shoulder 72 at its outer end which is adapted to abut surface 73 of insert piece 15. Additional shoulders 74, 75 and 76, all of the same diameter, are adapted, respectively, to journal in bore regions 77 at the outermost end of 15, 78 in each of the three webs 47, and 79 at the innermost end of the insert piece. Accordingly, choke 12 is supported at evenly spaced points along its entire length to prevent bowing, the choke piece at the same time lying athwart passages 46 to restrict the flow of material therethrough as a function of the angular position of choke 12 with respect to bore 48.

The cross-sectional profile of choke 12 is represented on an enlarged scale in Fig. 5. A preferred configuration utilizes a composite of three circular arcs, the arc from 12 o'clock position, indicated at A, to about 12:20 o'clock position, indicated at B, being drawn on a radius of $19/32$" from the longitudinal axis of choke 12 as center, while that at point B to point C, near 1:15 o'clock position, is $5/16$" radius. The arc from C to D, corresponding to 3 o'clock position, is $1\frac{1}{16}$" radius drawn from the point of intersection of the transverse horizontal central plane of choke 12 with bore 48. This profile is repeated symmetrically on both sides of the vertical and horizontal centerlines of the choke. In operation, it will be understood that choke 12 restricts the flow of molten polymer through passage 46 to a greater or lesser degree, depending upon its angular disposition, the position of maximum opening being that shown in Fig. 5, whereas maximum restriction is obtained with the choke turned 90° around in either direction from that shown in Fig. 5. In any case, choke 12 never completely cuts off the flow of plastic to the extruding die, although it enables the operator to vary the back pressure opposed to the source of supply within rather wide limits, as may be necessary with polymers of widely differing molecular weights.

An important advantage of the pressure regulator described is that equal polymer flow is maintained at all times around both sides of the choke, which prevents the collection of polymer in dead spots at any point in the apparatus, which otherwise would result in thermal degradation of the stock in process accompanied by clogging and other difficulties.

In the preferred embodiment of this invention hereinbefore described circular bore 48 is shown to be of substantially greater diameter than the widths of slot 11' and through-going passage 46, although this is not essential and, in fact, in certain applications it may be desirable to reverse or otherwise modify this relative size relationship. Moreover, although the axis of bore 48 is represented as lying exactly on the common central plane of slot 11' and throughgoing passage 46, it will be understood that this relative disposition may be altered somewhat to suit requirements and the term "contiguous," as employed in the claims, is intended to be comprehensive of some offsetting in this respect.

The design is such as to permit ready dismantling with cleanup of the various elements of the apparatus and the substitution of different choke-insert combinations to suit the rheological properties of a wide variety of polymers, making for wide flexibility of pressure regulation. Control to any predetermined setting is readily achieved manually by turning a handwheel, not shown, connected with the shaft of worm 65, although this control can be made automatic by the use of an appropriate servo mechanism responsive to one or more conventional pieces of detecting apparatus if desired. Where manual control is utilized, it is desirable to mill opposite reference scales on both the handwheel and the outer face of the neighboring flange 64 to indicate the progressive angular movement of the choke in the course of adjustment.

While the pressure regulator hereinbefore described in detail utilizes circular extrusion dies for the forming of circular cross section polymer strands, it will be understood that numeorus other types of extrusion dies may be substituted at will, a single continuous slit, for example, producing a plastic sheet, whereas other shapes are adapted to the production of a variety of specific shapes of products. In this connection, it may be necessary to provide passages of predetermined different length past the choke, depending upon the particular extrusion die employed, so that the molten plastic will be given a full opportunity to remerge after transit past the choke. Furthermore, a symmetrical cross sectional shape of choke is not essential and asymmetry in this regard may be advantageous, depending upon the requirements of the particular situation. Also, while it is convenient to provide a separate insert piece 15 for operation in cooperation with the choke, it will be understood that the die body per se may be appropriately machined on its interior surfaces to achieve the same objective, thereby dispensing with the necessity for the insert piece.

It will be apparent to persons skilled in the art that this invention may be modified widely without departure from its essential spirit, such as by the choice of numerous choke profiles and in other ways, wherefor it is intended to be limited only by the scope of the following claims.

What is claimed is:

1. A variable pressure regulator for molten polymeric materials and substances of similar rheological properties comprising in combination a body piece provided with a closed passage for the reception of molten plastic under substantial super-atmospheric pressure from a source of supply, an outlet in communication with said passage discharging to an extrusion die, a circular bore in open communication with said outlet with longitudinal axis disposed across the line of flow between said outlet and said extrusion die, said longitudinal axis being contiguous and substantially parallel to the longitudinal central plane of said outlet, a rotatable choke having a profile which is a composite of a multiplicity of intersecting circular arcs of different diameters, said arcs being symmetrically disposed with respect to one another referred to both the transverse horizontal and vertical axes of said choke, said rotatable choke having a smaller maximum diameter than said circular bore and being journaled substantially centrally of said circular bore, and means for varying the angular position of said rotatable choke within said circular bore.

2. A variable pressure regulator for molten polymeric materials and substances of similar rheological properties comprising in combination a body piece provided with a closed passage for the reception of molten plastic under substantial super-atmospheric pressure from a source of supply, an outlet in communication with said passage discharging to an insert piece having a through-going passage discharging in turn to an extrusion die, said through-going passage in said insert piece being subdivided into a plurality of parallel flow paths by webs disposed substantially radially of said closed passage in said body piece, which webs are provided with bores disposed in line one with another, a circular bore in open communication with said through-going passage in said insert piece and in line with said bores in said webs with longitudinal axis disposed across the line of flow between said outlet and said extrusion die, said longitudinal axis being contiguous and substantially parallel to the longitudinal central plane of said through-going passage, a rotatable choke having an arcuate, non-circular profile and of smaller maximum diameter than said circular bore journaled substantially centrally of said circular bore and being journaled additionally in said bores in said webs to decrease bowing of said rotatable choke under the pressure of said molten plastic materials, and means for varying the angular position of said rotatable choke within said circular bore.

References Cited in the file of this patent

UNITED STATES PATENTS 588,415    Foster _____ Aug. 17, 1897